(12) United States Patent
Vincent et al.

(10) Patent No.: US 9,735,442 B2
(45) Date of Patent: Aug. 15, 2017

(54) FUEL CELL COMPRISING A PROTON-EXCHANGE MEMBRANE, HAVING AN INCREASED SERVICE LIFE

(75) Inventors: Remi Vincent, Grenoble (FR); Sylvie Escribano, Grenoble (FR); Alejandro Franco, Amiens (FR); Laure Guetaz, Grenoble (FR); Guillaume Krosnicki, Grenoble (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 399 days.

(21) Appl. No.: 14/008,609

(22) PCT Filed: Mar. 29, 2012

(86) PCT No.: PCT/EP2012/055618
§ 371 (c)(1),
(2), (4) Date: Jan. 7, 2014

(87) PCT Pub. No.: WO2012/130931
PCT Pub. Date: Oct. 4, 2012

(65) Prior Publication Data
US 2014/0193740 A1    Jul. 10, 2014

(30) Foreign Application Priority Data

Mar. 31, 2011    (FR) ...................... 11 52744

(51) Int. Cl.
*H01M 8/1004*    (2016.01)
*H01M 4/86*    (2006.01)
(Continued)

(52) U.S. Cl.
CPC ....... *H01M 8/1004* (2013.01); *H01M 4/8636* (2013.01); *H01M 4/8642* (2013.01);
(Continued)

(58) Field of Classification Search
CPC .. H01M 4/926; H01M 8/1004; H01M 8/1007; H01M 4/8652; H01M 4/9075;
(Continued)

(56) References Cited

U.S. PATENT DOCUMENTS

| 2004/0126644 | A1 | 7/2004 | Bett et al. | |
| 2009/0280384 | A1* | 11/2009 | An | C08G 65/4025 429/493 |
| 2010/0196788 | A1* | 8/2010 | Enomura | B01F 7/00775 429/483 |

FOREIGN PATENT DOCUMENTS

| EP | 1742282 | 1/2007 |
| EP | 1830424 | 9/2007 |

(Continued)

OTHER PUBLICATIONS

Machine Translation of JP 2005-317492 A, obtained Jan. 12, 2016.*
(Continued)

*Primary Examiner* — Nicholas P. D'Aniello
(74) *Attorney, Agent, or Firm* — Occhiuti & Rohlicek LLP

(57) ABSTRACT

A fuel cell includes a proton-exchange membrane, and a cathode and anode fixed on its opposite sides. The anode delimits a flow conduit between a molecular-oxygen inlet area and a water outlet area. The cathode includes a support for catalyst material. The support has first and second materials to which catalyst is fixed, the first material being a graphitized material. The second material has a resistance to corrosion by oxygen that is greater than that of the first material. A quantity of the second material at the inlet area is greater than a quantity of the second material at the water outlet. The cathode comprises a first layer including the first material and a second layer including the second material. A
(Continued)

thickness of the second layer decreases between the molecular-oxygen inlet area and the water outlet area.

20 Claims, 2 Drawing Sheets

(51) Int. Cl.
    *H01M 4/90*     (2006.01)
    *H01M 4/92*     (2006.01)
    *H01M 8/1007*     (2016.01)
    *B82Y 30/00*     (2011.01)

(52) U.S. Cl.
CPC ....... *H01M 4/8652* (2013.01); *H01M 4/8657* (2013.01); *H01M 4/90* (2013.01); *H01M 4/9075* (2013.01); *H01M 4/9083* (2013.01); *H01M 4/92* (2013.01); *H01M 4/925* (2013.01); *H01M 4/926* (2013.01); *H01M 8/1007* (2016.02); *B82Y 30/00* (2013.01); *H01M 2004/8689* (2013.01); *Y10S 977/734* (2013.01)

(58) Field of Classification Search
CPC .. H01M 4/925; H01M 4/8657; H01M 4/8642; H01M 4/9083; H01M 4/90; H01M 4/92; H01M 4/8636
USPC .......................................................... 429/482
See application file for complete search history.

(56) References Cited

FOREIGN PATENT DOCUMENTS

| | | | |
|---|---|---|---|
| JP | 2005135671 | | 5/2005 |
| JP | 2005317492 A | * | 11/2005 |
| JP | 2008288006 A | * | 11/2008 |
| JP | 2009064604 | | 3/2009 |

OTHER PUBLICATIONS

Zhang et al. "A review of platinum-based catalyst layer degradation in proton exchange membrane fuel cells"; Journal of Power Sources; 194(2): 588-600 (2009); XP026499637.

* cited by examiner

FUEL CELL COMPRISING A PROTON-EXCHANGE MEMBRANE, HAVING AN INCREASED SERVICE LIFE

CROSS REFERENCE TO RELATED APPLICATION

This application is the national phase under 35 USC 371 of international application no. PCT/EP2012/055618, filed Mar. 29, 2012, which claims the benefit of the priority date of French application no. 1152744, filed Mar. 31, 2011. The contents of the aforementioned applications are incorporated herein in their entirety.

FIELD OF DISCLOSURE

The invention pertains to fuel cells, and especially to proton-exchange membrane fuel cells.

BACKGROUND

Fuel cells are especially envisaged as an energy source for future mass-produced motor vehicles. A fuel cell is an electrochemical device that converts chemical energy directly into electrical energy. A fuel cell comprises a stack of several cells in series. Each cell generates voltage of the order of 1 Volt and their stacking enables the generation of a power supply voltage of a higher level, for example of the order of 100 volts.

SUMMARY

Among the known types of fuel cells, we can cite especially the proton-exchange membrane called the PEM. Such fuel cells have particularly interesting properties of compactness. Each cell has an electrolytic membrane enabling only the passage of protons and not the passage of electrons. The membrane enables the separation of the cell into two compartments to prevent direct reaction between the reactant gases. The membrane comprises an anode on a first face and a cathode on a second face, this assembly being usually designated by the term "membrane/electrode assembly".

At the anode, molecular hydrogen or hydrogen (H2) used as fuel is ionized to produce protons passing through the membrane. The electrons produced by this reaction migrate to a flow plate and then pass through an electrical circuit external to the cell to form an electrical current. At the cathode, oxygen is reduced and reacts with the protons to form water.

The fuel cell can comprise several flow plates, for example made of metal, stacked on one another. The membrane is positioned between two flow plates. The flow plates can comprise channels and holes to guide the reactants and products to and from the membrane. The plates are also electrically conductive so as to form collectors for the electrons generated at the anode. Gas diffusion layers are interposed between the electrodes and the flow plates and are in contact with the flow plates.

The service life of a proton-exchange membrane fuel cell is still far too short. Fuel cells undergo ageing characterized, for example, by a water-logging of the cathode or by an irreversible deterioration of the nano-materials of the cathode, for example due to the deterioration of the carbon support and of the catalyst. These phenomena lead to a gradual deterioration of the performance of the cell.

Managing the presence of water in the fuel cell is relatively complicated. Indeed, the cathode reaction implies the generation of water, and water is also necessary to maintain the proton conductivity of the membrane. Thus, it can be necessary to humidify the reactant gases beforehand so that the membrane can be humidified. However, an excessive quantity of water can cause the flooding of the catalytic sites and thus cause an interruption of the working of the cell by blocking the access of oxygen to the reactant sites.

Certain scientific studies have also noted that the deterioration of performance could be due to a gradual change in the nanostructural properties of the cathode. Certain studies have also shown that the thickness of the cathode active layer diminishes greatly after only a few hours of operation. Such deterioration is attributed to a reaction of corrosion of the carbon support of the cathode by water in the following reaction:

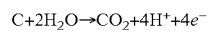

$$C+2H_2O \rightarrow CO_2+4H^++4e^-$$

The redox potential of this reaction is about 0.2V (SHE). Since the cathode potential of the cell is generally greater than 0.2V, the conditions of such a reaction are then met. In addition, the constant presence of large quantities of water in the cathode favors the reaction.

Besides, the corrosion can be accentuated during the stopping/starting phases or during the power cycles of the cell. Indeed, the membrane is not perfectly impermeable to gases. Thus, molecular oxygen or oxygen (O2) gets diffused through the membrane to reach the anode. The quantity of hydrogen (H2) available can prove to be insufficient to react with the oxygen (O2) in the anode. The oxygen (O2) in the anode then reacts with the protons generated by the corrosion reaction. This oxygen (O2) thus acts as a proton pump and accentuates the corrosion phenomenon. The corrosion of the carbon support reduces the catalytic surface of the cathode, induces the separation of the platinum particles from the support and increases the electrical contact resistance between the cathode and its gas diffusion layer.

Other factors of deterioration are the oxidation, dissolving and re-crystallization of platinum. Electrochemical maturation also induces an increase in the size of the platinum particles, which is unfavorable to the operation of the cell.

These different phenomena continue to affect the service life of the fuel cells far too greatly for large-scale applications. The increased use of fuel cells in products distributed to the general public will require an appreciable increase in their service life and a reduction of their manufacturing costs.

The document JP2009-064604 describes a fuel cell including a proton-exchange membrane, an anode and a cathode fixed on either side of the proton-exchange membrane. The cathode delimits a flow conduit between an oxygen (O2) inlet area and a water outlet area. The cathode comprises a catalyst support including a first graphitized material to which the catalyst is fixed and a second material to which the catalyst is fixed, the second material having a resistance to corrosion by oxygen greater than the resistance of the graphitized material.

The document by Lim Katie, Oh Hyung-Suk and Kim Hansung, "Use of a carbon nanocage as a catalyst support in polymer electrolyte membrane fuel cells", Electrochemistry Communications 2009, vol. 11, No. 6, pp. 1131-1134, describes nanometric structures to form a carbon support on which platinum is fixed to form a cathode. Such a cathode has a substantially increased resistance to corrosion but a cost of fabrication incompatible with industrial-scale production for large-scale distribution.

There is therefore a need for a fuel cell which has both increased service life and reduced cost of fabrication. The invention thus relates to a fuel cell comprising:

a proton-exchange membrane;
an anode and a cathode fixed on either side of the proton-exchange membrane, the anode delimiting a flow conduit between an oxygen (O2) inlet area and water outlet area.

The cathode comprises a support of the catalyst material including a first graphitized material to which the catalyst is fixed and a second material to which the catalyst is fixed, this second material showing a resistance to corrosion by oxygen greater than the resistance of the graphitized material, the quantity of this second material at the inlet area being greater than the quantity of this second material at the outlet.

The cathode comprises a first layer including the first material and a second layer including the second material, the thickness of the second layer decreasing between the inlet area and the outlet area.

According to one variant, the concentration of the second material at the inlet area is greater than 10% by mass.

According to another variant, the concentration of the second material at the inlet area is greater, by at least 50%, than the concentration of the second material at the outlet area.

According to yet another variant, the second material is chosen from the group comprising fullerene, TiO2 and SnO2.

According to yet another variant, the anode delimits a flow conduit between a hydrogen (H2) inlet area and a hydrogen (H2) outlet area, the hydrogen outlet area being disposed so as to be facing the oxygen (O2) inlet area.

BRIEF DESCRIPTION OF THE FIGURES

Other features and advantages of the invention shall appear more clearly from the following description, given by way of an indication that is in no way exhaustive, with reference to the appended drawings, of which.

DETAILED DESCRIPTION

The inventors have noted that proton-exchange membrane fuel cells show a generally greater degree of wear on the cathode in the oxygen (O2) inlet area.

The invention proposes a fuel cell comprising a support of the catalyst material including a first graphitized material to which the catalyst is fixed. The support of the cathode also includes a second material to which the catalyst is fixed, this second material having a resistance to corrosion by oxygen greater than the resistance of the graphitized material. The quantity of this second material at the oxygen (O2) inlet is greater than the quantity of this second material at the water outlet.

Thus, the invention optimally improves the protection of the cathode against corrosion at the oxygen (O2) inlet without in any way thereby appreciably affecting its cost of fabrication or its performance.

Figure 1:
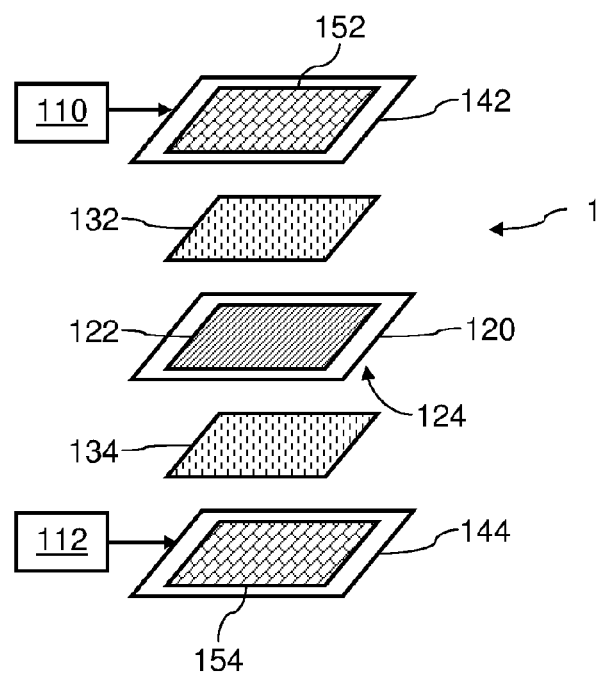
FIG. 1 is a schematic exploded view in perspective of a cell of a fuel cell.

FIG. 1 is a schematic exploded view in perspective of a cell 1 of a fuel cell. The cell 1 is of a proton-exchange membrane or polymer electrolyte membrane type. The cell 1 of the fuel cell comprises a fuel source 110 feeding hydrogen (H2) to a first inlet 168 of the cell. The cell 1 also has a first outlet 166 to remove excess hydrogen (H2). The cell 1 has a flow conduit extending between the first inlet and the first outlet. The cell 1 also has an air source 112 feeding a second inlet 162 of the cell with air, the air containing oxygen (O2) used as an oxidant. The cell 1 furthermore has a second outlet 164 to remove the excess oxygen (O2), the water from the reaction and heat. The cell 1 has a flow conduit extending between the second inlet 162 and the second outlet 164. The cell 1 can also have a cooling circuit not shown.

The cell 1 has an electrolyte layer 120 formed for example by a polymer membrane. The cell 1 also has an anode 122 and a cathode 124 placed on either side of the electrolyte 120 and fixed to the electrolyte 120. The cell 1 has flow guide plates 142 and 144 positioned so as to be respectively facing the anode 122 and the cathode 144. The cell 1 furthermore has a gas diffusion layer 132 positioned in the flow conduit between the anode 122 and the guiding plate 142. The cell 1 furthermore has a gas diffusion layer 134 positioned in the flow conduit between the cathode 124 and the guiding plate 144.

The plates 142 and 144 have faces oriented towards the electrolyte layer 120 respectively comprising areas 152 and 154 comprising a set of grooves or channels. The areas 152 and 154 comprise the grooves or channels enabling hydrogen (H2) and air to be conveyed respectively into the cell 1.

The plates 142 and 144 are made out of metal such as stainless steel in a manner known per se. The plates 142 and 144 are usually designated as bipolar plates, a same component generally comprising a guide plate 142 belonging to a cell and a guide plate 144 belonging to an adjacent cell. The plates 142 and 144 are conductive and are used to collect the current generated by the cell 1.

The electrolyte layer 120 forms a semi-permeable membrane enabling proton conduction while at the same time being impermeable to gases in the cell 1. The electrolyte layer 120 also prevents a passage of electrons between the anode 122 and the cathode 124. The layer of electrolyte 120 however does not form a perfect barrier to the diffusion of gas and especially to the diffusion of oxygen (O2).

During the operation of the fuel cell 1, air flows between the electrolyte 120 and the plate 144, and hydrogen (H2) flows between the electrolyte 120 and the guiding plate 142. At the anode 122, hydrogen (H2) is ionized to produce protons which pass through the electrolyte 120. The electrons produced by this reaction are collected by the plate 142 and applied to an electrical load connected to the cell 1 to form an electrical current. At the cathode 124, oxygen is reduced and reacts with the protons to form water. The reactions at the anode and the cathode are set as follows:

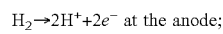
$H_2 \rightarrow 2H^+ + 2e^-$ at the anode;

$4H^+ + 4e^- + O_2 \rightarrow 2H_2O$ at the cathode.

When it is in operation, a cell 1 usually generates a DC voltage of the order of 1V between the anode and the cathode.

In the embodiments that shall be described here below, the outlet 166 faces the inlet 162 and the inlet 168 faces the outlet 164. Hydrogen (H2) and oxygen (O2) therefore flow in opposite senses inside the cell 1. The diffusion of oxygen (O2) is of particularly critical importance at the inlet 162, this area being the most subject to corrosion. Indeed, at the inlet 162, only a limited part of this oxygen (O2) has then reacted with the cathode 124, and the inlet 162 is at the hydrogen (H2) removal outlet on the anode side 122 and therefore at an area where the quantity of hydrogen (H2) that can react with the diffused oxygen (O2) is further reduced. The diffused oxygen (O2) at the inlet 162 therefore tends to react with protons coming from the corrosion reaction of a carbon support of the cathode 124.

According to the invention, the cathode 124 has a support of catalyst material including a first graphitized material to which the catalyst is fixed. The support of the cathode 124 also includes a second material to which the catalyst is fixed, the second material having a resistance to corrosion by oxygen greater than the resistance of the graphitized material. The quantity of this second material at the oxygen (O2) inlet 162 is greater than the quantity of this second material at the outlet 164. Thus, the phenomenon of corrosion of the cathode 124 is diminished without excessively affecting the cost price of the cell or its performance.

The second material could for example include fullerene, doped $SnO_2$ or doped $TiO_2$. Other metal oxides could also be included in the second material. The second material could enable diffusion of gases and diffusion of protons. Limiting the use of this second material to the necessary areas limits the cost price of the cathode 124 and the deterioration of its performance. Indeed, it may be necessary to use a second material having either a higher cost than that of the first material or lower performance as compared with the first material (proton permittivity, coupling with the catalyst, etc).

The catalyst material used for the cathode 124 will advantageously be made of platinum for its excellent catalytic performance.

Figure 2:
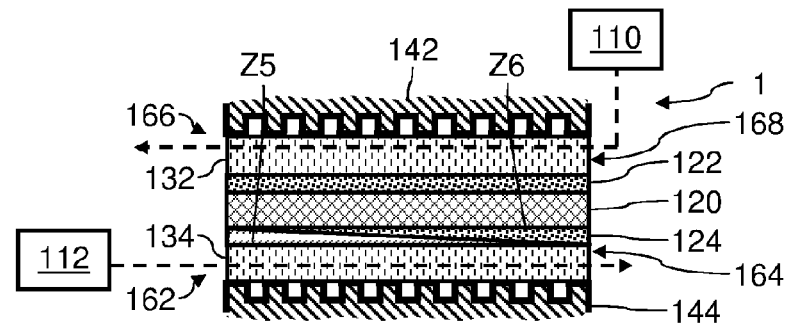
FIG. 2 is a view in section of a cell of a fuel cell according to a first embodiment of the invention.

FIG. 2 is a schematic view in section of the cell 1 of the fuel cell according to a first embodiment of the invention. In the first embodiment illustrated in FIG. 2, the cathode 124 has two layers Z5 and Z6. The layers Z5 and Z6 are superimposed in the direction of their thickness. The layer Z5 has a homogenous concentration in reinforced material. The layer Z6 has a homogenous concentration of graphitized material. The thickness of the layer Z5 decreases continuously between the inlet 162 and the outlet 164. The thickness of the layer Z6 increases continuously between the inlet 162 and the outlet 164. The assembly of the layers Z5 and Z6 has a constant thickness.

For the formation of a cathode 124 according to this embodiment, it is possible to make each layer Z5 and Z6 by printing with a specific ink. The thickness of these layers could be adjusted by spraying a variable quantity of ink on the different locations of the membrane 120. These inks could contain a solvent, a graphitized support material, the resistant support material and a catalyst.

Although this is not illustrated, it is also possible to make a cathode 124 with a layer comprising a concentration of reinforced material that decreases between the inlet 162 and the outlet 164.

Advantageously, the concentration of the second material at the inlet 162 is greater than 10% by mass. Preferably, the concentration of the second material at the inlet area 162 is greater, by at least 50%, than the concentration of the second material at the outlet area 164.

Comparative tests were made with cells according to the invention as compared with a comparable cell of the prior art. An appreciable improvement was observed in the service life of the cells according to the invention. This improvement was in the range of 35% as compared to the cell of the prior art.

According to a first improvement of the invention, the thickness of the membrane 120 at the oxygen (O2) inlet 162 is greater than its thickness at the outlet 164. In practice, the part of the membrane 120 at the inlet has a proton resistance higher than its proton resistance at the outlet 164. Thus, the diffusion of oxygen (O2) at the inlet 162 is reduced.

Using a smaller thickness of membrane 120 at the outlet 164 fosters the crossing of the protons into an area of the cathode 124 that is less critical in terms of corrosion. Thus, the performance of the cell 1 is only marginally reduced in return for a substantial gain in service life.

Figure 3:
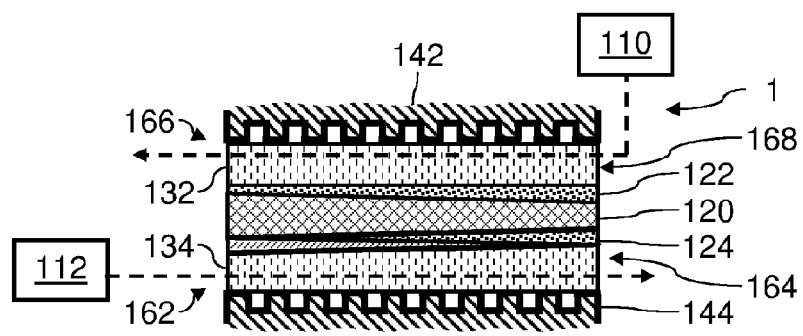
FIG. 3 is a view in section of a cell of a fuel cell according to variants of the first embodiment.

According to a first variant of the first improvement illustrated in FIG. 3, the membrane 120 has a thickness that decreases continuously between the inlet 162 and the outlet 164. Such a membrane 120 can be made in a particularly easy way, for example by a process of casting combined with evaporation, enabling easy control over the local thickness of the membrane 120. Such a variation of thickness can be obtained by locally depositing a greater or smaller quantity of material during the casting.

Advantageously, the thickness of the membrane 120 at the inlet 162 is greater by at least 40% than the thickness of the membrane 120 at the outlet 164.

The anode 122 can for example comprise supports including an association of aggregates of carbon and ionomers. Platinum nanoparticles are then fixed to these aggregates. The ionomer of the cathode or the anode can be identical to the ionomer used to form the membrane. The anode 122 can be made by application of an ink to the membrane 120 or to a respective gas diffusion layer. The ink can typically comprise the combination of a solvent, an ionomer and platinized carbon.

The gas diffusion layer 132 is used to diffuse hydrogen (H2) from a flow channel of the plate 142 towards the anode 122.

The gas diffusion layer 134 is used to diffuse air from a flow channel of the plate 144 towards the cathode 124.

The gas diffusion layers 132 and 134 can for example be obtained in a manner known per se in the form of fiber, felt or graphite fabric on which a hydrophobic agent is fixed, for example polytetrafluoroethylene. Advantageously, the gas diffusion layers 132 and 134 have a thickness five times greater than the thickness of the assembly including the membrane 120, the anode 122 and the cathode 124. Since the gas diffusion layers 132 and 134 are generally compressible, they make it possible to absorb the heterogeneity of thickness of the membrane/electrode assembly. The gas diffusion layers 132 and 134 could for example have a thickness of 200 μm to 500 μm.

According to a second improvement of the invention, the anode 122 can have a quantity of catalyst at the hydrogen (O2) outlet 166 smaller than the quantity of catalyst at the hydrogen (O2) inlet 168. Thus, a limit is placed on the aptitude of the oxygen (O2) that has passed through the membrane 120 to react with the protons passing through the membrane rather than with the smaller quantity of hydrogen at the outlet 166. Thus, the proton pump effect at the outlet 166 is limited.

FIG. 3 illustrates a variant of the first embodiment according to this second improvement. In this variant, the anode 122 has a homogenous concentration of catalyst. The thickness of the anode 122 at the outlet 166 is however smaller than its thickness at the inlet 168. More specifically, the thickness of the anode 122 increases continuously between the outlet 166 and the inlet 168. Thus, the quantity of catalyst at the outlet 166 is smaller than the quantity of catalyst at the inlet 168.

The formation of an anode 122 of this kind can be done by inkjet printing methods.

Although this is not illustrated, it is possible to envisage the making of an anode 122 of homogenous thickness with a decreasing concentration of catalyst between the inlet 168 and the outlet 166.

The invention claimed is:

1. A manufacture comprising a fuel cell, said fuel cell comprising a proton-exchange membrane, a cathode fixed on a first side of said proton-exchange membrane, and an anode fixed on a second side of said proton-exchange membrane, wherein said anode delimits a flow conduit between a molecular-oxygen inlet area and a water outlet area, wherein said cathode consists of a first catalyst layer and a second catalyst layer, wherein said first catalyst layer includes a first material, wherein said second catalyst layer includes a second material, wherein said first material comprises a graphitized material, wherein said second material has a resistance to corrosion by oxygen that is greater than a resistance to corrosion by oxygen of said first material, wherein a thickness of said first catalyst layer decreases from said water outlet area to said molecular-oxygen inlet area, wherein a thickness of said first catalyst layer at said water outlet area is less than a thickness of said first catalyst layer at said molecular-oxygen inlet area, wherein a thickness of said second catalyst layer decreases from said molecular-oxygen inlet area to said water outlet area, and wherein a thickness of said first catalyst layer at said molecular-oxygen inlet area is greater than a thickness of said second catalyst layer at said water outlet area.

2. The manufacture of claim 1, wherein a concentration of said second material at said molecular-oxygen inlet area is greater than 10% by mass.

3. The manufacture of claim 1, wherein a concentration of said second material at said molecular-oxygen inlet area is greater, by at least 50%, than a concentration of said second material at said water outlet area.

4. The manufacture of claim 1, wherein said second material comprises fullerene.

5. The manufacture of claim 1, wherein said second material comprises doped titanium dioxide.

6. The manufacture of claim 1, wherein said second material comprises doped stannic oxide.

7. The manufacture of claim 1, wherein said anode delimits a flow conduit between a molecular-hydrogen inlet area and molecular-hydrogen outlet area, and wherein said molecular-hydrogen outlet area is disposed to face said molecular-oxygen inlet area across said proton-exchange membrane.

8. The manufacture of claim 1, wherein said proton-exchange membrane, has a thickness at said inlet area that is at least 40% greater than a thickness thereof at said outlet area.

9. The manufacture of claim 1, wherein said first catalyst layer has a homogeneous concentration of graphitized material.

10. The manufacture of claim 1, further comprising a catalyst-material support, wherein said catalyst-material support comprises a layer that comprises an oxide of tin.

11. The manufacture of claim 1, wherein said cathode comprises layers that vary in thickness between said inlet area and said outlet area, and wherein a superimposition of said layers has a constant thickness between said inlet area and said water outlet area.

12. The manufacture of claim 1, wherein said cathode comprises layers that change thickness continuously between said inlet area and said outlet area.

13. The manufacture of claim 1, further comprising a first guiding plate, a second guiding plate, a first gas diffusion layer, and a second gas diffusion layer, wherein said first guiding plate has a face that is oriented towards said proton-exchange membrane, wherein said second guiding plate has a face that is oriented towards said proton-exchange membrane, wherein said first gas diffusion layer is positioned between said first guiding plate and said anode, wherein said second gas diffusion layer is positioned between said cathode and said second guiding plate, and wherein said face of said first guiding plate faces said face of said second guiding plate.

14. The manufacture of claim 1, wherein said proton-exchange membrane has a variable thickness between said inlet area and said outlet area.

15. The manufacture of claim 1, wherein said proton-exchange membrane has a thickness at said inlet area that is greater than a thickness thereof at said outlet area.

16. The manufacture of claim 1, wherein said material that is more resistant to corrosion by oxygen than said graphitized material comprises an oxide of titanium.

17. The manufacture of claim 1, further comprising fullerene disposed in a catalyst-material support outside of said first catalyst layer.

18. The manufacture of claim 1, wherein said first catalyst layer has a thickness that decreases continuously from said inlet area and said water outlet area and wherein said second catalyst layer has a thickness that increases continuously from said inlet area and said water outlet area.

19. The manufacture of claim 1, wherein said anode delimits a flow conduit between an inlet area for receiving molecules of hydrogen and for discharging molecules of hydrogen, wherein said inlet and outlet areas are disposed such that a line between them passes through said proton-exchange membrane.

20. The manufacture of claim 1, wherein said proton-exchange membrane has a resistance to proton flow at said outlet area and a resistance to proton flow at said inlet area, and wherein said resistance to proton flow at said outlet area is less than said resistance to proton flow at said inlet area.

* * * * *